United States Patent
Wied et al.

(10) Patent No.: US 7,212,720 B2
(45) Date of Patent: May 1, 2007

(54) METHOD FOR PRODUCING AN OPTICAL FIBER TERMINATION AND FIBER OPTIC CONDUCTOR

(75) Inventors: Achim Wied, Siefersheim (DE); Jürgen Meinl, Hohenstein-Holzhausen (DE); Thomas Henrich, Steinbach (DE); Thomas Weingärtner, Gau-Algesheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/243,540

(22) Filed: Oct. 5, 2005

(65) Prior Publication Data
US 2006/0072893 A1 Apr. 6, 2006

(30) Foreign Application Priority Data
Oct. 5, 2004 (DE) .................. 10 2004 048 741

(51) Int. Cl.
*G02B 6/00* (2006.01)
*G02B 6/04* (2006.01)
(52) U.S. Cl. ...................... 385/139; 385/115
(58) Field of Classification Search .............. 385/54, 385/139
See application file for complete search history.

(56) References Cited

U.S. PATENT DOCUMENTS

| | | | | |
|---|---|---|---|---|
| 3,655,275 A | * | 4/1972 | Seagreaves | 385/53 |
| 4,021,098 A | * | 5/1977 | McCartney et al. | 385/81 |
| 4,217,084 A | * | 8/1980 | Jacques et al. | 425/321 |
| 4,984,859 A | * | 1/1991 | Fujigaki et al. | 385/114 |
| 5,058,985 A | * | 10/1991 | Davenport et al. | 385/115 |
| 6,085,011 A | * | 7/2000 | Klausmann et al. | 385/115 |
| 6,243,520 B1 | * | 6/2001 | Goldman | 385/115 |
| 6,349,572 B1 | | 2/2002 | Meinl et al. | |
| 6,733,187 B2 | * | 5/2004 | Page et al. | 385/78 |

FOREIGN PATENT DOCUMENTS

| | | |
|---|---|---|
| DE | 26 30 730 | 1/1977 |
| DE | 195 04 678 A1 | 8/1995 |
| DE | 196 04 678 A1 | 8/1996 |
| DE | 198 55 958 A1 | 6/2000 |

\* cited by examiner

*Primary Examiner*—Michelle Connelly-Cushwa
*Assistant Examiner*—Chris H. Chu
(74) *Attorney, Agent, or Firm*—Laurence A. Greenberg; Werner H. Stemer; Ralph E. Locher

(57) ABSTRACT

In a method for producing a termination of an optical fiber bundle, the optical fiber bundle is combined at one end in a crimping sleeve, and the crimping sleeve is introduced with the end of the optical fiber bundle into a compression device having a crimping tool which matches the end geometry of the optical fiber bundle. Advantageous effects are achieved by the fact that the crimping sleeve is compression molded over the end of the optical fiber bundle with a predetermined crimping force by the crimping tool, and in that the crimping force is regulated during the compression molding process depending on the material of the crimping sleeve. In this case, the compression molding process is begun, carried out and ended depending on the distance, time and/or force by a regulating unit.

9 Claims, 1 Drawing Sheet

FIG. 1B
FIG. 1A
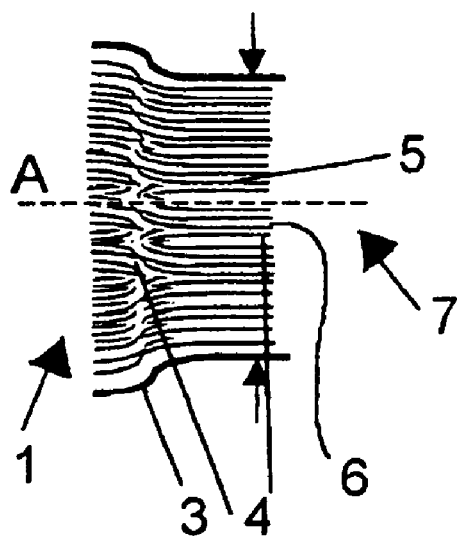
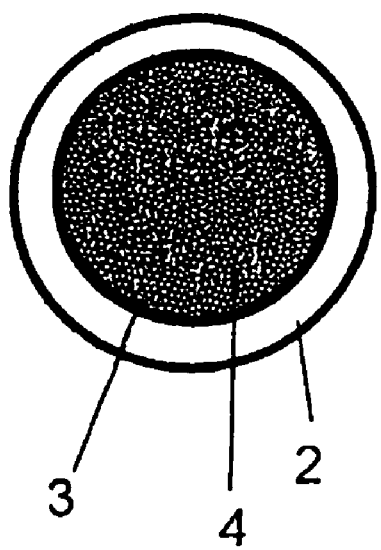
FIG. 2B
FIG. 2A
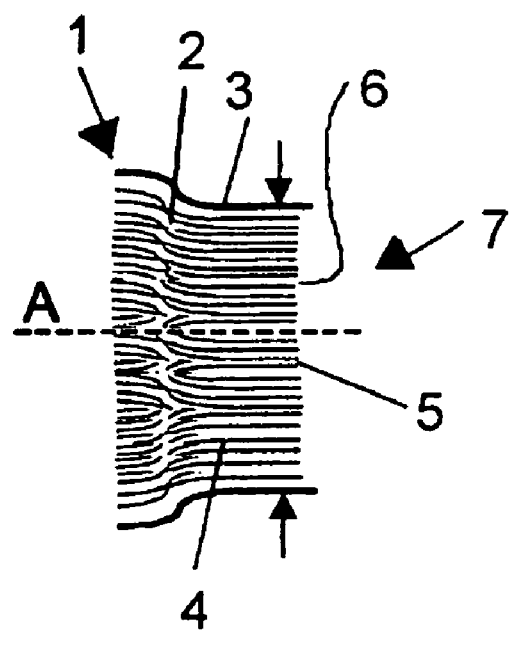
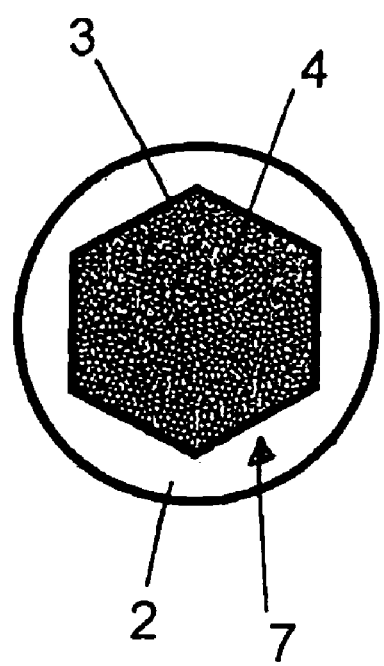

METHOD FOR PRODUCING AN OPTICAL FIBER TERMINATION AND FIBER OPTIC CONDUCTOR

BACKGROUND OF THE INVENTION

Field of the Invention

The invention relates to a method for producing a termination of an optical fiber bundle. The optical fiber bundle is combined at one end in a crimping sleeve, and the crimping sleeve is introduced with the end of the optical fiber bundle into a compression device having a crimping tool that matches the end geometry of the optical fiber bundle. Furthermore, the invention includes a fiber optic conductor containing an optical fiber bundle and a crimping sleeve that has a termination at one end produced in accordance with the method according to the invention.

In order to transmit light, flexible fiber optic conductors having at least one optical fiber bundle are often used which contain a large number of optical fibers. In such optical fiber bundles, the optical fibers are usually combined at at least one common end.

For combining the optical fibers at their common end, methods are already known in the prior art. For example, optical fibers are connected to one another and to a sleeve that has been pushed on, by adhesive bonding. This method that is in wide use has the disadvantage that the adhesive material used generally limits the temperature resistance of the optical fiber bundle. Furthermore, the packing density of the optical fibers in the sleeve and thus also the optical capacity of the fiber optic conductors thus produced or the optical fiber bundle is restricted. Finally, the adhesive applied to the ends generally does not have sufficient chemical resistance, with the result that such fiber optic conductors or the optical fiber bundle can only be used to a limited extent.

In order to overcome these disadvantages, methods are known in the prior art in which the individual fibers are hot-melted with one another in a common sleeve and with the sleeve. Published, non-prosecuted German patent application DE 26 30 730 A1 discloses a method in which a sleeve is pressed onto the optical fiber bundle when the sleeve is soft owing to heating. In this case, the individual fibers are deformed hexagonally.

Published, non-prosecuted German patent application DE 196 04 678 A1 discloses a method in which the individual optical fibers are fused with one another at the ends of the optical fiber bundle. For this purpose, the entire optical fiber bundle is set in rotational movement for the purpose of fusing the common end, which results in considerable difficulties in terms of treatment, which is associated with considerable restrictions in the production of more complex or larger components. In this case, the optical fiber ends and the compression tools are brought to the deformation temperature in an electrically heated oven. In the case of larger component diameters, the fusing process therefore requires several hours. A defined temperature setting of the individual fibers to be fused is not possible in these methods owing to the physical shape required for the oven.

Published, non-prosecuted German patent application DE 198 55 958 A1 (corresponding to U.S. Pat. No. 6,349,572) discloses a method in which the loose individual fibers are held together provisionally to form a round, tightly packed bundle. The optical fiber bundle is pushed into the metallic sleeve with a tight fit. In this case, the sleeve has sufficient heat resistance at the deformation temperature of the glass. The sleeve is then introduced into a clamping device for the purpose of fixing the optical fiber bundle in the axial and radial direction and brought to the deformation temperature together with the inserted optical fiber ends.

Subsequently, the heated end of the clamped optical fiber bundle is compressed to form a hexagonal package while the individual fibers are deformed, the metallic sleeve being pressed against this package without a glass seal forming between the fused optical fiber bundle and the metallic sleeve. After cooling, the optical fiber bundle is removed from the clamping device.

Heating of the optical fiber ends ensures a deformation process that can be reproduced. This results in virtually hexagonal fusing of the total bundle diameter at the ends, even in the case of relatively large diameters up to approximately 30 mm. This results in that the fibers lie parallel to one another in the fused region and that centricity of the fused region is achieved, which overall leads to improved radiation characteristics of the optical fiber bundle.

After the deformation process, the outer metal sleeve can be removed again from the optical fiber bundles fused to one another since they are not connected to one another. It is also possible for the optical fiber bundles to be used with ends that have been fused together in accordance with the method and without a metal sleeve.

One disadvantage of the known methods described above is primarily the considerable complexity of the devices and of the production. In particular, a great deal of care and experience is necessary to carry the method out without these methods rapidly resulting in overheating and thus destruction of the sleeve or the adhesive materials or, on overheating, in undesirable changes in the optical properties of the optical fiber ends and their light exit surfaces.

Furthermore, the production of optical fiber bundles using the known methods and devices is associated with considerable costs since heating and cooling of the ends takes up time and energy.

SUMMARY OF THE INVENTION

It is accordingly an object of the invention to provide a method for producing an optical fiber termination and fiber optic conductor which overcome the above-mentioned disadvantages of the prior art devices and methods of this general type, without dispensing with the essential advantages which have already been achieved with the known methods. In particular, it is one object of the invention to provide a method that is suitable for series production of optical fiber bundles and can be operated in an economically and ecologically sustainable manner. The invention is also based on the object of improving the methods described initially such that an optical fiber bundle having improved optical properties and a broader range of use can be produced in a simple manner and using simple measures.

With the foregoing and other objects in view there is provided, in accordance with the invention, a method for producing a termination of an optical fiber bundle. The method includes combining the optical fiber bundle at one end in a crimping sleeve, introducing the crimping sleeve with the one end of the optical fiber bundle into a compression device having a crimping tool which matches an end geometry of the optical fiber bundle, and compressing molding the crimping sleeve over the one end of the optical fiber bundle with a predetermined crimping force by the crimping tool. The predetermined crimping force is regulated during the compression molding in dependence on a material of the crimping sleeve.

Advantages of the solution according to the invention compared with existing methods are, in particular, achieved by the fact that the crimping sleeve is compression molded over the end of the optical fiber bundle with a predetermined crimping force by the crimping tool, and that the crimping force is regulated during the compression molding process depending on the material of the crimping sleeve.

One development of the method according to the invention is provided by the fact that the compression molding process is begun, carried out and ended depending on the distance, time and/or force by a regulating unit.

The use of a deformation force specific to the crimping sleeves advantageously leads to it being possible for tolerances in the diameter of the glass fiber bundle to be compensated for automatically. In this case, the optical fiber ends are combined in the crimping sleeve without them having to be heated in the process. The crimping sleeves are compression molded in this process such that, after compression molding, the optical fiber ends remain clamped in the crimping sleeve in a geometrical shape which is predetermined by the crimping tool. This results in the further advantage that the processing times for the production of an optical fiber end are short, preferably in the seconds range. It is thus possible to produce a large number of optical fiber bundles with combined ends in series production without using a great deal of energy or time and at low cost.

In this case, it is still possible to combine optical fiber bundles having large diameters at one end and to realize different cross sections during or after deformation. It is thus possible for any desired cross section to be produced at the optical fiber ends. For example, terminations at the optical fiber bundles having a plurality of edges can be compression molded, such as terminations having four, five or six edges.

As a result of the fact that a time-intensive and cost-intensive heating and cooling phase can be dispensed with, thermal stresses are avoided at the optical fiber ends. In addition, different sleeve materials can be used and pretreatment of the crimping sleeve or optical fiber ends prior to compression molding with other materials is also not necessary. It is thus also possible to dispense with additional auxiliary materials or operating materials without any reductions in quality compared with known methods.

Since it is advantageously possible with the invention also to dispense with complex adhesive bonding methods or, correspondingly, adhesives, a sufficiently high quality of the optical fiber bundles is achieved without pretreatment of the crimping sleeve, the optical fiber ends or the tools being necessary. Time-consuming method steps or else devices for providing adhesives and for curing the adhesives at adhesively bonded optical fiber ends are avoided. It is thus possible for thermal or UV light after-treatment to be completely dispensed with. Furthermore, devices for metering the adhesive, and the care and maintenance of these devices, are superfluous. As a result, it is also possible for optical fiber bundles to be produced without being contaminated by adhesive, as a result of which further after-treatment steps can be dispensed with. Costs and processing time can thus also be reduced compared with the known adhesive bonding methods.

The method according to the invention can be used in a simple, cost-effective and energy-saving manner for the series production of optical fiber bundles with combined ends.

One development of the method according to the invention is achieved by the fact that the crimping sleeve is compressed to the optical fiber bundle at the beginning of the compression molding process using a crimping force above the required deformation force of an empty crimping sleeve and below the breaking load of the individual optical fibers.

This advantageously ensures that the optical fiber ends are combined with care. It is thus possible for breakage of fibers and damage to the fiber end faces to be avoided at the optical fiber ends.

This is achieved according to the invention by the fact that the crimping force to be applied is determined, set and regulated using electronic, mechanical, pneumatic and/or hydraulic devices.

The force regulation during the process can be converted both using mechanical devices, for example by pre-stressing spring elements which do not permit any further increase in force when a force value, which can be set, is exceeded, in which case a mechanical lever press deforms the crimping sleeve in accordance with the specifications. The adjustable spring element is in this case a lever arm that can be adjusted depending on the torque, can be operated manually, semi-automatically or fully automatically and interrupts the force transfer when a predetermined lever force is reached. Furthermore, the invention contains solutions in which distance, time and/or force control are realized using electronic, pneumatic or hydraulic devices.

An important factor of the method according to the invention is the fact that the crimping force on the crimping sleeve does not exceed or fall below specific values, and that the crimping force is sensed directly or indirectly during the process and actively influences the process run as an essential control variable.

In this case, the plastic properties of the material of the crimping sleeve can be sensed by a regulating unit before the crimping sleeve comes to bear against the optical fiber ends. Together with prescribed values for the breaking strength of the optical fiber material, it is thus possible to determine the crimping force and to apply it in the compression process. This makes it possible for the selection of crimping sleeves to be flexible.

During a current series production process, it is thus possible to use crimping sleeves having different materials without the production process having to be interrupted for resetting work. The production process can thus take place in largely automated fashion.

In this regard, the invention provides for the parameters required for determining the crimping force to be applied and/or already achieved to be sensed by force sensors.

With the method according to the invention it is advantageously possible for the force sensors to measure the parameters indirectly and/or directly, preferably directly by force pick-ups and/or indirectly by sensing the drive data on the crimping tool.

One development of the method is achieved by the fact that the crimping force is restricted by the regulating unit to a predetermined maximum value that is dependent on the material of the optical fibers. Depending on the requirements as regards the physical shape of the terminal of the optical fiber bundles, the invention provides for the crimping sleeve to be compression molded on the optical fiber bundle by the crimping tool to form terminals which are closed in cross section, are shaped in terms of their edge geometries and have a plurality of edges, preferably to form terminals having four to seven edges. The invention also includes a fiber optic conductor containing an optical fiber bundle and a crimping sleeve which has a termination at one end produced in accordance with the method according to the invention, in which case provision is made for the termination to have a closed shape which is geometrical in terms of its edges, and preferably to have four to seven edges. In this case, provision is advantageously also made for the termination to be free of beading on the outside in the direction of the longitudinal axis and/or in the area of the crimping sleeve. The invention also provides for the fiber ends of the optical fiber bundle to be held fixedly in the crimping sleeve, preferably without the use of adhesives and hot-melts.

Other features which are considered as characteristic for the invention are set forth in the appended claims.

Although the invention is illustrated and described herein as embodied in a method for producing an optical fiber termination and a fiber optic conductor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a diagrammatic, cross-sectional view of an end section of an optical fiber bundle having a crimping sleeve after the compression process to form a circular terminal;

FIG. 1B is a diagrammatic, longitudinal sectional view of the end section of the optical fiber bundle shown in FIG. 1A;

FIG. 2A is a diagrammatic, cross-sectional view of the end section of the optical fiber bundle having the crimping sleeve after the compression process to form a terminal having six edges; and FIG. 2B is a diagrammatic, longitudinal sectional view of the end section shown in FIG. 2A.

DESCRIPTION OF THE PREFERRED EMBODIMENTS

Referring now to the figures of the drawing in detail and first, particularly, to FIGS. 1A and 1B thereof, there is shown an end section 1 of an optical fiber bundle 2 having a crimping sleeve 3 in a cross sectional view, FIG. 1A and a longitudinal sectional view taken along an axis A of the sleeve after the compression process, FIG. 1B. The optical fiber bundle 2 contains a large number of optical fibers 4 that have surfaces 6 at their ends 5 for the exit or entry of light.

In the present drawing, the end section 1 of the optical fiber bundle 2 is shaped to form a circular terminal 7. In FIGS. 2A, 2B, in an analogous manner to FIGS. 1A, 1B, the end section 1 of the optical fiber bundle 2 having the crimping sleeve 3 has been shaped to form a terminal 7 having six edges.

In both illustrations, the terminal 7 has been produced with the crimping sleeve 3 such that it is robust and resistant to high temperatures by the method according to the invention without adhesives or hot deformation or hot-melting processes having been used.

In this case, the terminal 7 of the optical fiber bundle 2 is combined at one end in a crimping sleeve 3, and the crimping sleeve 3 is introduced with the end of the optical fiber bundle 2 into a compression device having a crimping tool which matches the end geometry of the optical fiber bundle 2. The compression device and the crimping tool are not illustrated in the drawing.

The crimping sleeve 3 is compression molded in accordance with the invention over the end section 1 of the optical fiber bundle 2 with a predetermined crimping force by the crimping tool and is thus fixedly connected to the optical fiber bundle 2, the optical fibers 4 being held together by the crimping sleeve 3. Here, provision is made for the crimping force to be regulated during the compression molding process depending on the material of the crimping sleeve 3.

For this purpose, the compression molding process is begun, carried out and ended depending on the distance, time and/or force by a regulating unit. The crimping force at the beginning of the compression molding process is above the required deformation force of an empty crimping sleeve 3 and below the breaking load of the individual optical fibers 4. According to the invention, the crimping force is determined and set by an electronic regulating unit. The electronic regulating unit is likewise not illustrated in the drawing.

The electronic regulating unit determines the crimping force to be applied or already achieved which is predetermined on the crimping tool. The parameters required for this purpose are sensed by force sensors, the force sensors measuring the parameters indirectly or directly. The parameters are preferably sensed directly by force pick-ups or indirectly by sensing the drive data on the crimping tool. In this case, the crimping force can be measured by detecting the required current of the drive motor or the like. As a result, the crimping force is restricted by the regulating unit to a predetermined maximum value that is dependent on the material of the optical fibers 4.

The crimping sleeve 3 is shaped with the end section 1 of the optical fiber bundle 2 by the crimping tool in terms of its geometrical edges or such that it is closed in cross section. In the present case in FIGS. 1A, 1B, the terminals have been compressed so as to be circular, or so as to have six edges in FIGS. 2A, 2B the compression molding process having been carried out and ended depending on the distance, time or force by the regulating unit.

The terminals 7 shown in FIGS. 1A–2B are produced without beading on the outside in the direction of the longitudinal axis A or in the area of the crimping sleeve 3, the ends of the optical fibers 4 of the optical fiber bundle 2 being held fixedly in the crimping sleeve 3 without the use of adhesives and hot-melts.

At the beginning of deformation, the end section 1, thus combined, of the optical fiber bundle is inserted into a crimping tool after the optical fibers 4 have been assembled in the crimping sleeve 3. In the crimping tool, the crimping sleeve 3 is deformed into the envisaged shape by the crimping tool which matches, in terms of geometry, the desired final shape of the terminal 7.

At the end of deformation, the compression molding process brought about by the crimping tool is ended when a predetermined crimping force has been reached. Active control of the compression molding process using the crimping force is critical for achieving the advantages according to the invention.

As a result, it is advantageously possible for the process to be controlled and influenced prior to and during the compression molding process, as a result of which the number of erroneous attempts at setting the crimping device can be considerably reduced and optimum setting is possible even before the production process, which ensures largely fault-free, series production of optical fiber bundles 2.

Owing to the use of the crimping force which is specific for the crimping sleeve 3 as the decisive variable controlling the compression molding process, tolerances in the diameter of the glass fiber bundle are automatically compensated for, the processing times can be minimized and thus remain in the seconds range for the compression molding process. The method is equally suitable for wide diameters of the end sections 1 and for narrow diameters. Different cross sections or shapes of the terminals 7 can also be integrally formed subsequently, after deformation.

It is possible with the method according to the invention to produce optical fiber bundles 2 of a high quality. The optical fiber bundles 2 according to the invention have a high luminous intensity compared with known methods, which is achieved by damage-free fiber ends. In this case, the method according to the invention is considerably more favorable in terms of costs, time and energy requirements compared with known methods.

This application claims the priority, under 35 U.S.C. § 119, of German patent application No. 10 2004 048 741.3, filed Oct. 5, 2004; the entire disclosure of the prior application is herewith incorporated by reference.

We claim:

1. A method for producing a termination of an optical fiber bundle, which comprises the steps of:
   combining the optical fiber bundle at one end in a crimping sleeve;
   introducing the crimping sleeve with the one end of the optical fiber bundle into a compression device having a crimping tool which matches an end geometry of the optical fiber bundle;
   compressing molding the crimping sleeve over the one end of the optical fiber bundle with a predetermined crimping force by the crimping tool physically contacting the optical fiber bundle, and continuously regulating the predetermined crimping force during the compression molding in dependence on a material of the crimping sleeve; and
   sensing an actual crimping force during the process and using the actual crimping force as a control variable for actively influencing the compressing molding.

2. The method according to claim 1, which further comprises beginning, carrying out and ending the compression molding step in dependence on a distance, time and/or force using a regulating unit.

3. The method according to claim 1, which further comprises compressing the crimping sleeve to the optical fiber bundle at a beginning of the compressing molding step with the predetermined crimping force being above a required deformation force of an empty crimping sleeve and below a load of a breaking point of individual optical fibers.

4. The method according to claim 1, which further comprises determining, setting and regulating the predetermined crimping force to be applied using electronic, mechanical, pneumatic and/or hydraulic means.

5. The method according to claim 1, which further comprises sensing parameters required for determining the predetermined crimping force to be applied and/or already achieved with force sensors.

6. The method according to claim 5, wherein the force sensors measure the parameters directly by means of force pick-ups and/or indirectly by means of sensing drive data on the crimping tool.

7. The method according to claim 1, which further comprises restricting the predetermined crimping force, via a regulating unit, to a predetermined maximum value which is dependent on a material of optical fibers forming the optical fiber bundle.

8. The method according to claim 1, which further comprises compression molding the crimping sleeve on the optical fiber bundle by the crimping tool to form the terminal to be closed in cross section, shaped in terms of its edge geometry and having a plurality of edges.

9. The method according to claim 8, which further comprises forming the terminal to have four to seven edges.

* * * * *